(12) United States Patent
Koido et al.

(10) Patent No.: US 9,985,327 B2
(45) Date of Patent: May 29, 2018

(54) AIR SECONDARY BATTERY

(71) Applicants: HONDA MOTOR CO., LTD., Tokyo (JP); Massachusetts Institute of Technology, Cambridge, MA (US)

(72) Inventors: Tetsuya Koido, Wako (JP); Akihiro Kushima, Arlington, MA (US); Yoshiya Fujiwara, Wako (JP); Ju Li, Weston, MA (US)

(73) Assignees: HONDA MOTOR CO., LTD., Tokyo (JP); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 150 days.

(21) Appl. No.: 14/835,076

(22) Filed: Aug. 25, 2015

(65) Prior Publication Data

US 2016/0064788 A1 Mar. 3, 2016

Related U.S. Application Data

(60) Provisional application No. 62/043,660, filed on Aug. 29, 2014.

(51) Int. Cl.
*H01M 4/86* (2006.01)
*H01M 4/38* (2006.01)
(Continued)

(52) U.S. Cl.
CPC .......... *H01M 12/08* (2013.01); *H01M 4/382* (2013.01); *H01M 4/861* (2013.01);
(Continued)

(58) Field of Classification Search
CPC .......... H01M 4/86; H01M 4/38; H01M 12/06; H01M 12/08; H01M 4/96
See application file for complete search history.

(56) References Cited

U.S. PATENT DOCUMENTS

| 7,211,352 B2 * | 5/2007 | Lee .................. H01M 10/0565 |
| | | 429/306 |
| 8,632,920 B2 | 1/2014 | Nakanishi et al. |
| 2011/0200891 A1 | 8/2011 | Kotani et al. |

FOREIGN PATENT DOCUMENTS

| JP | 2010-257839 | 11/2010 | |
| WO | 00/44057 | 7/2000 | |
| WO | WO 00/44057 | * 7/2000 | .............. H01M 4/86 |

OTHER PUBLICATIONS

Bruce, et al., "Li—O2 and Li—S batteries with high energy storage", Nature Materials, Jan. 2012, pp. 19-29, vol. 11, No. 1.
(Continued)

*Primary Examiner* — Jonathan Crepeau
*Assistant Examiner* — Angela Martin
(74) *Attorney, Agent, or Firm* — Rankin, Hill & Clark LLP

(57) ABSTRACT

An air secondary battery has a positive electrode to which an oxygen-containing gas is supplied, a negative electrode containing a metal active material, and an electrolytic solution through which a metal ion generated from the metal active material is transported. The positive electrode contains a composite containing a matrix and a zeolite disposed in the matrix. The matrix is in the form of a porous body which the electrolytic solution permeates. In the matrix, the zeolite has an oxygen-containing gas passage through which only the oxygen-containing gas can flow.

9 Claims, 4 Drawing Sheets

(51) Int. Cl.
*H01M 4/96* (2006.01)
*H01M 12/06* (2006.01)
*H01M 12/08* (2006.01)
*H01M 4/02* (2006.01)

(52) U.S. Cl.
CPC ....... *H01M 4/8605* (2013.01); *H01M 4/8621* (2013.01); *H01M 4/8647* (2013.01); *H01M 12/06* (2013.01); *H01M 4/96* (2013.01); *H01M 2004/027* (2013.01); *H01M 2004/8689* (2013.01); *Y02E 60/128* (2013.01)

(56) References Cited

OTHER PUBLICATIONS

European Search Report dated Dec. 9, 2015, 7 pages.

* cited by examiner

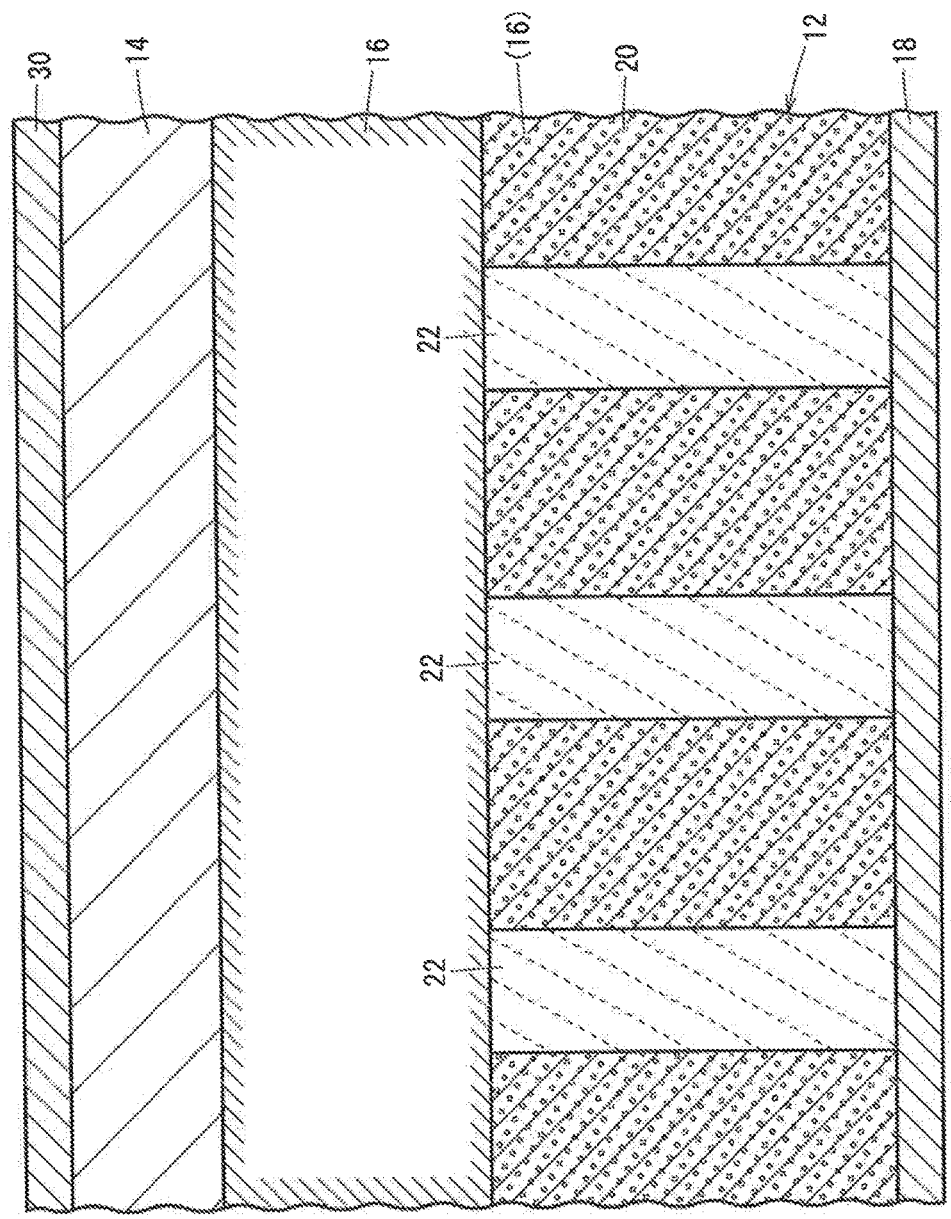

AIR SECONDARY BATTERY

CROSS-REFERENCE TO RELATED APPLICATION

This application is based upon and claims the benefit of priority from U.S. Provisional Patent Application No. 62/043,660 filed on Aug. 29, 2014, the contents of which are incorporated herein by reference.

BACKGROUND OF THE INVENTION

Field of the Invention

The present invention relates to an air secondary battery and more specifically to an air secondary battery containing a positive electrode having a matrix and an oxygen-containing gas passage formed in the matrix.

Description of the Related Art

Air batteries are electric batteries using oxygen as a positive electrode active material. Air primary batteries using zinc as a negative electrode active material have been widely used, and air secondary batteries, which are rechargeable, have been studied in recent years. In terms of high energy density, using of lithium as a negative electrode active material has been attempted in the air secondary batteries. However, as described in Peter G. Bruce, et al., NATURE MATERIALS, vol. 11, no. 1, pp. 19-29 (2012), the conventional air secondary batteries are disadvantageous in that the electric capacitance (or the cycle characteristic) tends to be deteriorated as a result of repeating the charge and discharge cycles and that the overpotential is large in the charge process.

As described in U.S. Pat. No. 8,632,920 and U.S. Patent Application Publication No. 2011/0200891, the above disadvantages are caused because air bubbles stay and accumulate on the boundary between the positive electrode and the electrolyte while the charge and discharge cycles are repeated, whereby the positive electrode is covered with the air bubbles. To solve this problem, U.S. Pat. No. 8,632,920 proposes that a permeation preventing layer for preventing oxygen permeation is formed on a surface of the positive electrode that faces the negative electrode.

U.S. Patent Application Publication No. 2011/0200891 proposes a conductive porous body disposed in the positive electrode. The air bubbles accumulated on the boundary between the positive electrode and the electrolyte are diffused and removed from the boundary to an oxygen supply port through the conductive porous body.

Furthermore, Japanese Laid-Open Patent Publication No. 2010-257839 discloses an air secondary battery having a positive electrode wherein the positive electrode is formed as a stack of first and second layers each having a catalyst, and the pore diameter of the first layer is different from that of the second layer. Therefore, even when the positive electrode has a large thickness, an oxygen-containing gas can be sufficiently diffused in the positive electrode.

SUMMARY OF THE INVENTION

As is well known, in the air secondary battery, a metal oxide is generated on the positive electrode in the discharge process. As a result of so-called in-situ observation of the air secondary battery in the charge and discharge processes, the present inventor presumes that pores in the positive electrode are clogged with the generated metal oxide, whereby oxygen cannot be readily supplied to the reaction field, and consequently it is difficult to induce the electrode reaction on the positive electrode.

As a result of intense research in view of ensuring an oxygen-containing gas passage in the positive electrode, the present invention has been accomplished.

A principal object of the present invention is to provide an air secondary battery which is capable of readily flowing an oxygen-containing gas in a positive electrode so that properties thereof are improved.

Another object of the present invention is to provide an air secondary battery containing a positive electrode having a portion which is permeated by an electrolytic solution and a portion through which an oxygen-containing gas flows, the portions being separated from each other.

According to an aspect of the present invention, there is provided an air secondary battery including a positive electrode to which an oxygen-containing gas is supplied, a negative electrode containing a metal active material, and an electrolytic solution through which a metal ion generated from the metal active material is transported.

The positive electrode contains a composite containing a matrix and a zeolite disposed in the matrix, and the matrix is in the form of a porous body which is permeated by the electrolytic solution.

In the matrix, the zeolite has an oxygen-containing gas passage through which only the oxygen-containing gas can flow.

The zeolite functions as a molecular sieve. Therefore, only the oxygen-containing gas goes into pores in the zeolite, while the electrolytic solution does not go thereinto. Thus, the electrolytic solution is prevented from entering the pores in the zeolite and from flowing through the zeolite.

The electrolytic solution permeates the matrix, and enters the pores in the matrix. Consequently, in the positive electrode, a portion through which the oxygen-containing gas flows is separated from a portion which is permeated by the electrolytic solution.

In the positive electrode having the above structure, oxygen in the oxygen-containing gas and the electrolytic solution can coexist only on the contact boundary between the matrix and the zeolite. Therefore, the electrode reaction of the positive electrode proceeds only on the contact boundary. In other words, the reaction field is only the contact boundary.

In the case of using a metal as a negative electrode active material in the air secondary battery, in a discharge process, the metal is oxidized to generate a metal oxide in the reaction field of the positive electrode. In the present invention, the reaction field is only the contact boundary between the matrix and the zeolite as described above. Therefore, the metal oxide is prevented from being generated in the pores (i.e. the oxygen-containing gas passage) in the zeolite.

Thus, in the present invention, in the positive electrode, the portion through which the oxygen-containing gas flows is separated from the portion which is permeated by the electrolytic solution. As a result, the oxygen-containing gas passage can be prevented from being clogged with the metal oxide generated by the electrode reaction.

Thus, the oxygen-containing gas can be rapidly supplied to the reaction field. Meanwhile, the generated oxygen can be rapidly discharged from the reaction field in a charge process. Therefore, the electrode reaction can be continuously induced, resulting in large discharge and charge capacities. Furthermore, the oxygen-containing gas can be supplied to and discharged from the reaction field at a high rate, so that the rate of the electrode reaction can be increased, and the overpotential can be reduced. Consequently, the air secondary battery having an improved property can be obtained.

Preferred examples of materials for the matrix include a carbon material and a metal material. Specific examples of the metal material include gold.

The metal oxide generated in the discharge process may be trapped by the matrix. Therefore, the pores in the zeolite can be further efficiently prevented from being clogged with the metal oxide.

The metal active material of the negative electrode preferably contains lithium. Owing thereto, the energy density of the air secondary battery can be increased.

In this case, a lithium oxide is generated in the discharge process. The lithium oxide may be trapped by the matrix.

The zeolite preferably has a dendritic shape in the matrix. In this case, the area of the reaction field can be increased, and the electrode reaction thus can be induced more efficiently.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a schematic cross-sectional view of an air secondary battery, which has a positive electrode with a zeolite structure being different from that of FIG. 1, taken along the thickness direction.

DESCRIPTION OF THE PREFERRED EMBODIMENTS

Figure 1:
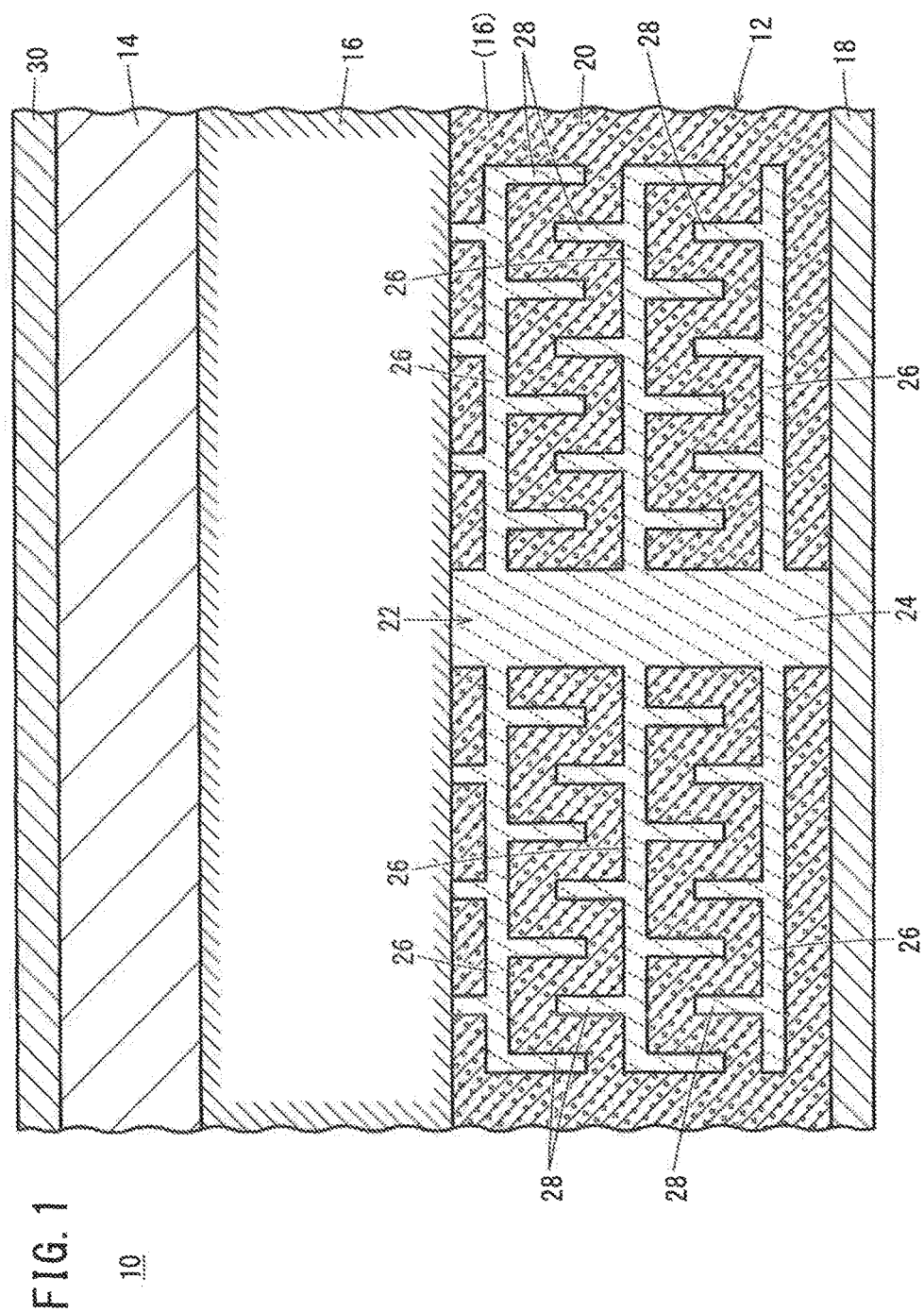
FIG. 1 is a schematic cross-sectional view of an air secondary battery according to an embodiment of the present invention taken along a thickness direction thereof.

A preferred embodiment of the air secondary battery of the present invention will be described in detail below with reference to the accompanying drawings. The scale sizes of components shown in the drawings do not necessarily correspond to the actual sizes.

FIG. 1 is a schematic cross-sectional view of an air secondary battery 10 according to this embodiment taken along the thickness direction. The air secondary battery 10 has a positive electrode 12, a negative electrode 14 containing metallic lithium as a metal active material, and an electrolytic solution 16 interposed between the electrodes 12, 14.

The positive electrode 12 is disposed on one surface of a first collector 18. For example, the first collector 18 is formed of a metal having excellent conductivity such as aluminum, copper, an alloy thereof, or the like.

In this embodiment, the positive electrode 12 contains a composite containing a matrix 20 and a zeolite 22 disposed in the matrix 20. The matrix 20 is a conductive porous body, and pores in the porous body are connected with each other to form a three-dimensional network structure.

For example, the matrix 20 preferably contains a carbon material. Alternatively, the matrix 20 may contain a metal material. Preferred specific examples of the metal materials include gold (Au). Of course, regardless of whether the carbon material or the metal material, the matrix 20 should be in the form of the porous body.

Since the matrix 20 is the porous body, the electrolytic solution 16 permeates into the matrix 20 and is retained in the pores of the matrix 20.

For example, the zeolite 22 disposed in the matrix 20 has one trunk 24 extending from the first collector 18 toward the negative electrode 14, and a plurality of main branches 26 extending from the trunk 24 in the horizontal directions of FIG. 1. Furthermore, a plurality of terminal branches 28 extend from each main branch 26. Thus, the zeolite 22 has a dendritic shape. Each of the terminal branches 28 extending upward (toward the negative electrode 14) is positioned in a clearance between the adjacent terminal branches 28 extending downward (toward the first collector 18).

The zeolite 22 acts as a molecular sieve. Therefore, in the air secondary battery 10, only the oxygen-containing gas can flow through the pores in the zeolite 22. The electrolytic solution 16 does not permeate the pores in the zeolite 22. Thus, the electrolytic solution 16 does not flow through the zeolite 22.

Specifically, in the positive electrode 12, the electrolytic solution 16 permeates the matrix 20 so that the pores in the matrix 20 are filled with the electrolytic solution 16, whereas the oxygen-containing gas flows through only the zeolite 22. Thus, in the positive electrode 12, a portion which is permeated by the electrolytic solution 16 is separated from a portion through which the oxygen-containing gas flows.

In the present embodiment, as described above, the metal active material of the negative electrode 14 is made of the metallic lithium. The negative electrode 14 (the metallic lithium) is supported by a second collector 30. Similarly to the first collector 18, the second collector 30 is made of a metal having excellent conductivity such as aluminum, copper, an alloy thereof, or the like.

The electrolytic solution 16, which is interposed between the positive electrode 12 and the negative electrode 14, has a lithium ion conductivity. The electrolytic solution 16 is prepared by dissolving an electrolyte salt in a solvent. In this embodiment, the electrolyte salt may be a lithium salt such as $LiPF_6$, $LiBF_4$, $LiClO_4$, $LiAsF_6$, or LiTFSI in order to achieve the lithium ion conductivity. The solvent for dissolving such a lithium salt may be ethylene carbonate, propylene carbonate, dimethyl carbonate, diethyl carbonate, ethyl methyl carbonate, ethyl carbonate, butylene carbonate, γ-butyrolactone, sulfolane, acetonitrile, 1,2-dimethoxymethane, 1,3-dimethoxypropane, diethyl ether, tetrahydrofuran, 2-methyltetrahydrofuran, dimethyl sulfoxide, diglyme, triethylene glycol dimethyl ether, etc. The solvent may be a mixed solvent containing two or more of the above solvents.

The positive electrode 12, the negative electrode 14, and the electrolytic solution 16, which are thus constructed, are placed in a casing (not shown). The casing has a supply hole for supplying the oxygen-containing gas (preferably air) to the positive electrode 12.

The air secondary battery 10 according to the present embodiment is basically constructed as above. Operations and advantageous effects of the air secondary battery 10 will be described below.

In a discharge process of the air secondary battery 10, the oxygen-containing gas such as air is supplied through the supply hole formed on the casing to the positive electrode 12. As described above, the oxygen-containing gas flows through only the zeolite 22. Thus, the oxygen-containing gas flows from the trunk 24 to the main branches 26, and further to the terminal branches 28 in the zeolite 22, and then reaches the boundary between the zeolite 22 and the matrix 20. Since the oxygen-containing gas does not flow through the matrix 20, the oxygen-containing gas does not flow further from the boundary between the zeolite 22 and the matrix 20.

Since the zeolite 22 has the dendritic shape, the oxygen-containing gas is distributed efficiently and uniformly over the entire positive electrode 12 (the matrix 20).

Meanwhile, in the negative electrode 14, the metallic lithium is ionized to generate lithium ions and electrons (e⁻). Thus, a reaction proceeds as represented by the following reaction formula (A).

$$Li \rightarrow Li^+ + e^- \tag{A}$$

Since the electrolytic solution 16 (electrolyte) is a lithium ion conductor, the generated lithium ions are transported through the electrolytic solution 16 toward the positive electrode 12. Since the electrolytic solution 16 permeates the matrix 20 (the pores) of the positive electrode 12, the lithium ions are transported through the electrolytic solution 16 contained in the pores of the matrix 20 and reach the contact boundary between the matrix 20 and the zeolite 22.

As described above, in the matrix 20, the oxygen-containing gas reaches the contact boundary. Thus, the lithium ions and the oxygen molecules in the oxygen-containing gas coexist on the contact boundary between the matrix 20 and the zeolite 22. Therefore, an electrode reaction between the lithium ions and the oxygen molecules occurs on the contact boundary. That is, the contact boundary acts as a reaction field.

The lithium ions and the oxygen molecules coexist only on the contact boundary. Thus, the reaction field for the lithium ions and the oxygen molecules lies only on the contact boundary.

The reaction between the lithium ions and the oxygen molecules is represented by the following reaction formula (B) or (C).

$$2(Li^+ + e^-) + O_2 \rightarrow Li_2O_2 \tag{B}$$

$$4(Li^+ + e^-) + O_2 \rightarrow *2Li_2O \tag{C}$$

Figure 2:
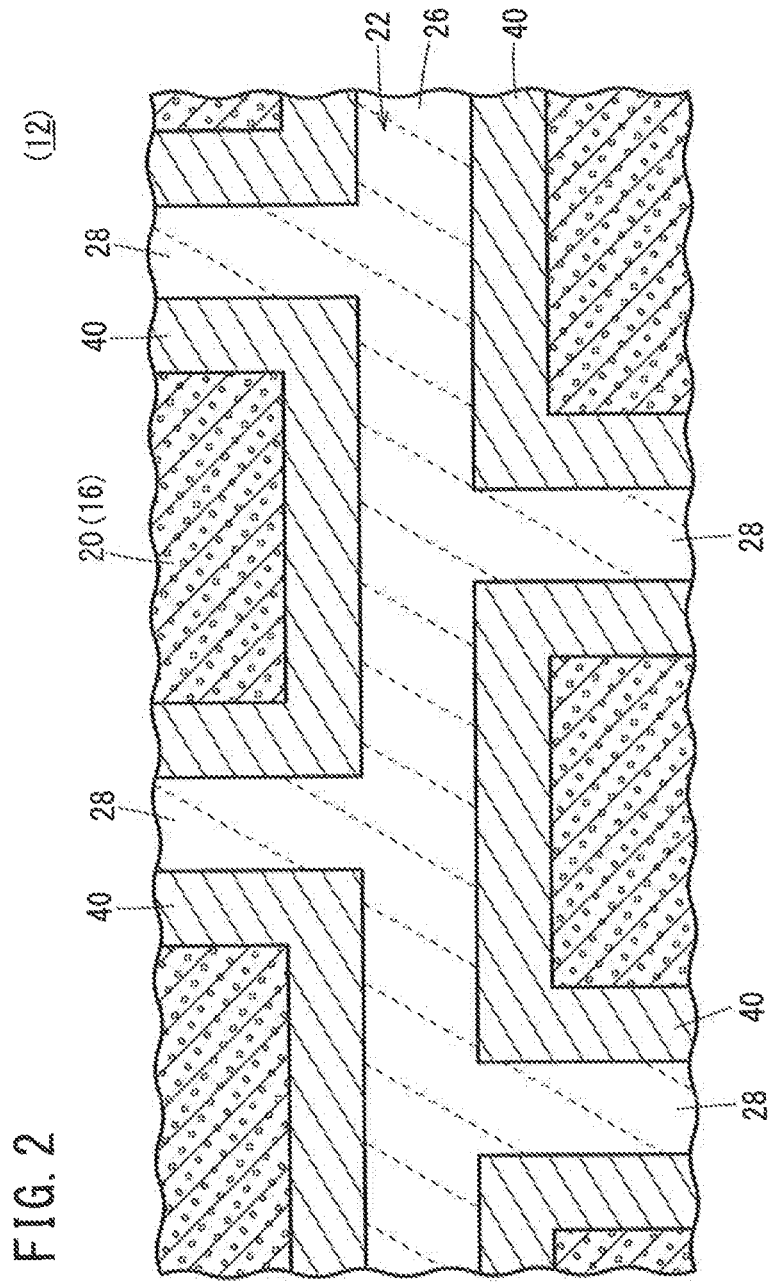
FIG. 2 is an enlarged schematic cross-sectional view of a principal part of a positive electrode in the air secondary battery in a discharge process.

As is clear from the formula, in the air secondary battery 10 using the metallic lithium as the negative electrode active material, a lithium oxide is generated in the discharge process. Since the reaction field lies only on the contact boundary, as shown in the enlarged schematic view of FIG. 2, the lithium oxide 40 is trapped by the matrix 20 and then located only on the contact boundary.

Since the electrolytic solution is prevented from permeating the zeolite 22, the lithium oxide 40 is not generated inside the zeolite 22 (the pores). Therefore, the pores in the zeolite 22 can be prevented from being clogged with the lithium oxide 40, so that the oxygen-containing gas passage in the zeolite 22 can maintain the function.

Consequently, the flow of the oxygen-containing gas in the zeolite 22 is not inhibited even after the generation of the lithium oxide 40. Therefore, the oxygen-containing gas can reach the boundary between the zeolite 22 and the matrix 20. Thus, on the reaction field, i.e., on the boundary, the above reaction between the lithium ions and the oxygen molecules can be continuously induced, resulting in large discharge capacity.

In a case where the discharge voltage is lowered to a predetermined threshold value, a charge process is carried out. In this process, the lithium oxide 40 is reduced to generate lithium and oxygen. Thus, in the positive electrode 12, a reverse reaction of the above reaction represented by the reaction formula (B) or (C), i.e. a reduction reaction represented by the following reaction formula (B') or (C'), proceeds to generate oxygen.

$$Li_2O_2 \rightarrow 2(Li^+ + e^-) + O_2 \tag{B'}$$

$$2Li_2O \rightarrow 4(Li^+ + e^-) + O_2 \tag{C'}$$

The generated oxygen flows through the oxygen-containing gas passage in the zeolite 22, and is discharged through the supply hole to the outside of the casing. As described above, the oxygen-containing gas passage is prevented from being clogged with the lithium oxide 40. Therefore, the oxygen generated in the positive electrode 12 can be rapidly discharged to the outside of the casing.

Consequently, the above reduction reaction is not inhibited. Therefore, the reduction reaction of the lithium oxide 40 can be continuously induced, resulting in large charge capacity.

As described above, the oxygen-containing gas passage is formed in the positive electrode 12, whereby the portion which the electrolytic solution 16 permeates is separated from the portion through which the oxygen-containing gas flows. In this case, the oxygen-containing gas can readily flow in the positive electrode 12. As a result, both of the discharge and charge capacities can be increased.

Furthermore, the oxygen-containing gas can be rapidly supplied to and discharged from the reaction field. Therefore, the electrode reaction rate can be improved, and the overpotential can be decreased.

As described above, the air secondary battery 10 according to the present embodiment can exhibit the large discharge and charge capacities and the lowered overpotential, i.e. improved properties.

The lithium ions move through the electrolytic solution 16 that permeates the positive electrode 12, and reach the negative electrode 14. Then, the lithium ions are reacted with electrons supplied from a charger to generate metallic lithium. Therefore, the discharge process can be repeatedly carried out.

Figure 3A:
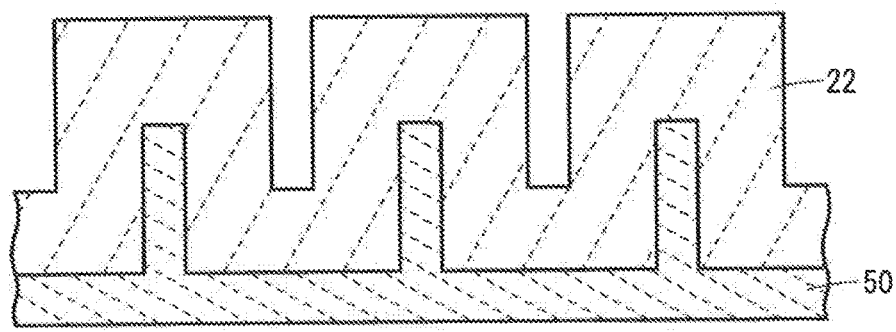
FIGS. 3A to 3C are schematic flow diagrams for illustrating a process for preparing the positive electrode.
Figure 3B:
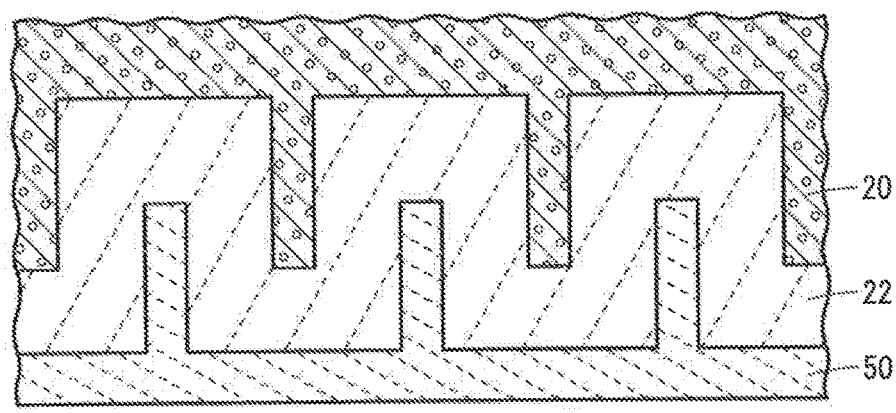
Figure 3C:
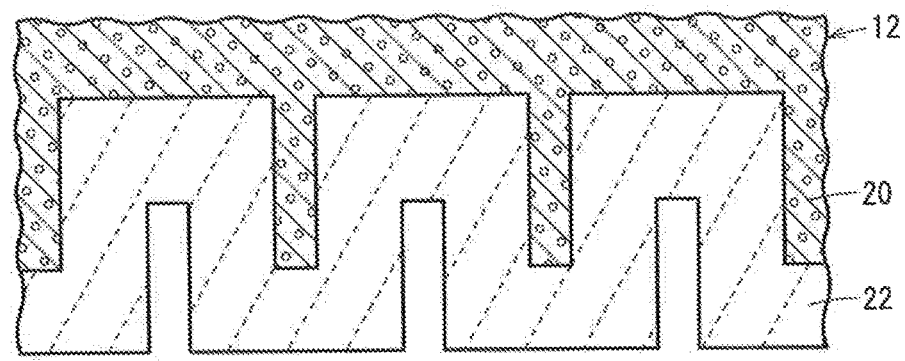

The positive electrode 12 in the air secondary battery 10 can be prepared, for example, as shown in FIGS. 3A to 3C. In FIGS. 3A to 3C, the shapes of a thin film of the zeolite 22 and the matrix 20 (the porous body) are simplistically shown to facilitate understanding.

First, as shown in FIG. 3A, the thin film of the zeolite 22 is formed on an alumina template 50 by using a method described in S. Kallus, et al., J. Sol-Gel Sci. Technol., vol. 26, pp. 721-725 (2003).

Next, as shown in FIG. 3B, the porous body (the matrix 20) is formed on the thin film of the zeolite 22. In the case of using the carbon material as the matrix 20, a freeze-drying process may be performed as described in H. Sun, et al., Adv. Mater., vol. 25, pp. 2554-2560 (2013). On the other hand, in the case of using a metal material (e.g., Au) as the matrix 20, an electrochemical dealloying process may be performed as described in J. Biener, et al., J. Appl. Phys., vol. 97, pp. 024301-1 to 024301-4 (2004). The composite of the thin film of the zeolite 22 and the matrix 20 (the porous body) containing the carbon material or the metal material (such as Au) can be obtained in this manner.

Then, as shown in FIG. 3C, the composite is lifted off from the alumina template 50. Thus-obtained composite can be used as the positive electrode 12.

It is to be understood that the present invention is not limited to the above embodiment, and various changes and modifications may be made therein without departing from the scope of the invention.

For example, though the metallic lithium is used as the negative electrode active material in the above embodiment, a lithium alloy may be used instead of the metallic lithium. The negative electrode active material is not limited to a lithium material for generating the lithium ions such as the metallic lithium and the lithium alloy, and may contain another metal such as magnesium, aluminum, zinc, sodium, iron, calcium, potassium, or an alloy thereof. The positive electrode active material may contain a metal other than Au, for example, Pt, Pd, etc.

In the positive electrode 12, the structure of the zeolite 22 in the matrix 20 is not limited to the dendritic shape shown in FIG. 1. The zeolite 22 may have a concave and convex shape (ridge and recess shape) shown schematically in FIGS. 3A to 3C or a simple straight shape shown in FIG. 4.

What is claimed is:

1. An air secondary battery comprising a positive electrode to which an oxygen-containing gas is supplied, a negative electrode containing a metal active material, and an electrolytic solution through which a metal ion generated from the metal active material is transported,
    wherein:
    the positive electrode contains a composite containing a matrix and a zeolite disposed in the matrix;
    the matrix is in the form of a porous body which is permeated by the electrolytic solution; and
    the zeolite defines an oxygen-containing gas passage through the matrix, and, among the oxygen-containing gas and the electrolytic solution, only the oxygen-containing gas can flow through the zeolite.

2. The air secondary battery according to claim 1, wherein the matrix contains a carbon material or a metal material.

3. The air secondary battery according to claim 2, wherein the matrix contains gold.

4. The air secondary battery according to claim 1, wherein the matrix acts to trap a metal oxide generated in a discharge process.

5. The air secondary battery according to claim 1, wherein the metal active material of the negative electrode contains lithium.

6. The air secondary battery according to claim 5, wherein the matrix acts to trap a lithium oxide generated in a discharge process.

7. The air secondary battery according to claim 1, wherein the zeolite has a dendritic shape in the matrix.

8. The air secondary battery according to claim 7, wherein the zeolite comprises a trunk from which a plurality of branches extend, the trunk and the plurality of branches being disposed within the matrix.

9. The air secondary battery according to claim 1, wherein among the oxygen-containing gas and the electrolytic solution, only the electrolytic solution can flow through the matrix.

* * * * *